United States Patent

[11] 3,547,468

| | | |
|---|---|---|
| [72] | Inventor | Sebastian J. Giuffrida<br>Bloomfield Hills, Mich. |
| [21] | Appl. No. | 785,922 |
| [22] | Filed | Dec. 23, 1968 |
| [45] | Patented | Dec. 15, 1970 |
| [73] | Assignee | Chrysler Corporation<br>High Park, Mich.<br>a corporation of Delaware |

[54] ENERGY ABSORBING RESTRAINT APPARATUS
2 Claims, 5 Drawing Figs.

[52] U.S. Cl......................................................... 280/150,
188/1, 297/386
[51] Int. Cl...................................................... B60r 21/10
[50] Field of Search........................................... 280/150SB;
297/386; 188/1C

[56] References Cited
UNITED STATES PATENTS

| 3,195,685 | 7/1965 | Blackstone.................. | 188/1(C) |
| 3,377,044 | 4/1968 | Jackson et al. ............... | 188/1(X) |
| 3,400,977 | 9/1968 | Jones............................ | 297/386 |
| 3,409,327 | 11/1968 | Radke et al.................... | 280/150(X) |
| 3,431,019 | 3/1969 | Lewis et al.................... | 188/1(X) |
| 3,446,533 | 5/1969 | Radke et al.................... | 297/386 |

*Primary Examiner*—Banjamin Hersh
*Assistant Examiner*—Leslie J. Paperner
*Attorney*—Harness, Talburtt & Baldwin ABSTRACT: Restraint system for a passenger in a vehicle including a restraining belt system extending across and in front of the passenger and an energy absorbing device connected between the belt system and the vehicle. The energy absorbing device includes a generally U-shaped housing having a plurality of pins extending between the sidewalls. A double layer of strip metal is threaded through the pins and when the strip metal is pulled through the pins as a result of the load placed on the belt system the metal bends and absorbs energy.

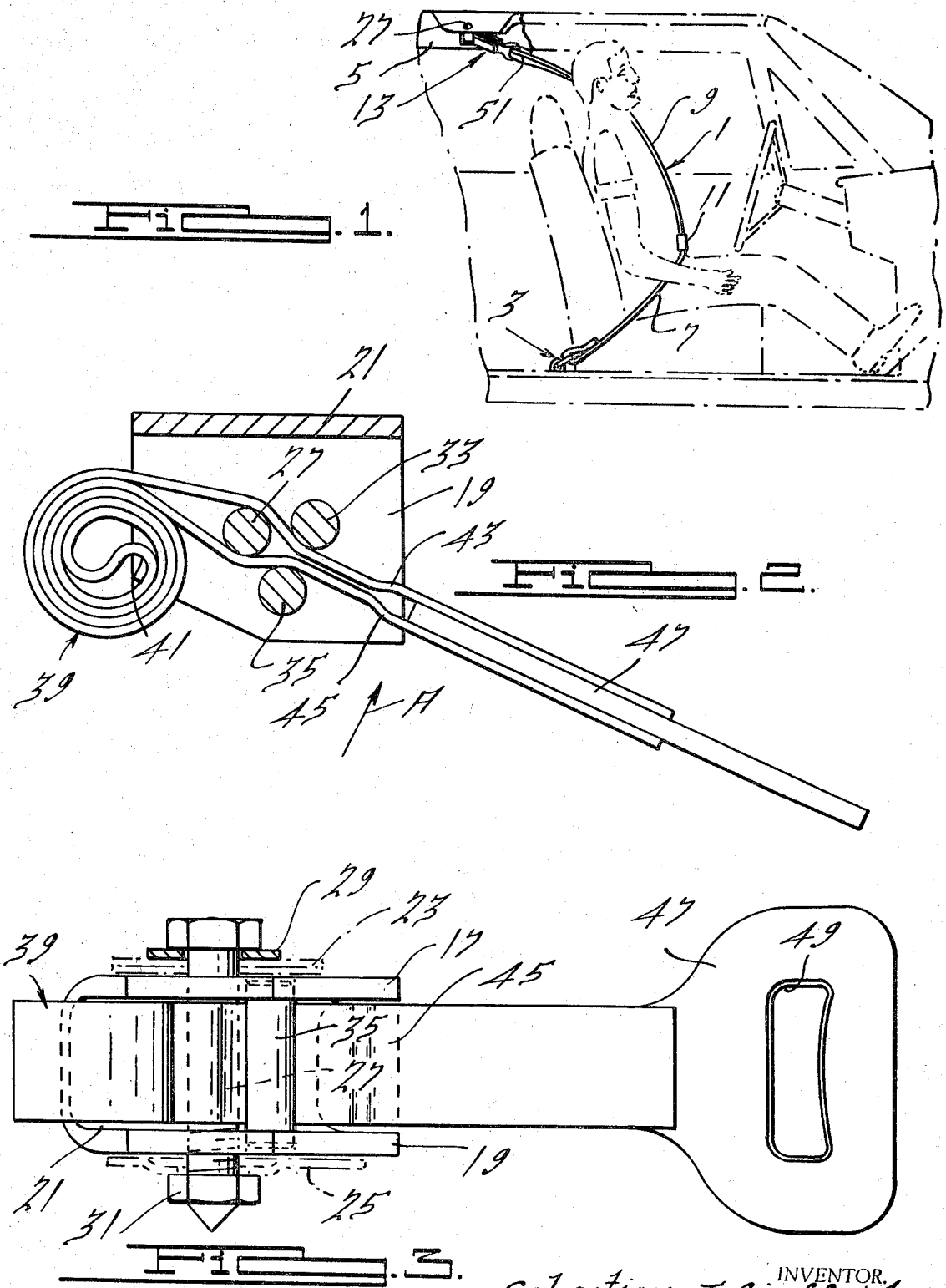

PATENTED DEC 15 1970

INVENTOR.
Sebastian J. Giuffrida
BY
Harness, Talburtt & Baldwin,
ATTORNEYS.

ENERGY ABSORBING RESTRAINT APPARATUS

BACKGROUND OF THE INVENTION

This invention relates to an energy absorbing device, and more particularly to an energy absorbing device for use in a passenger restraint system of a vehicle, such as an automobile.

It is obvious that when a vehicle decelerates rapidly, as during a frontal collision, for example, passengers must be restrained against substantial forward movement, relative to the passenger compartment, during such deceleration. Various restraint systems utilizing lap and shoulder belts have been devised to restrain the passengers. Many of these restraining belt constructions store the kinetic energy of a passenger during deceleration and then, when the forward movement of the passenger terminates, return the stored energy to the passenger causing him to rebound. It is desirable, of course, that the restraint system absorb the kinetic energy of the passenger so that the passenger is not subject to rebound action. Moreover, the load to which a passenger is subjected by some belt restraint systems during rapid deceleration is relatively high. It is desirable to reduce the high peak load to which the passenger is subjected. Restraint systems adapted to absorb the energy of a passenger have been devised and this invention relates to such a system.

SUMMARY OF THE INVENTION

Briefly, this invention relates to an energy absorbing system adapted to absorb energy transferred to the system by a passenger in a vehicle when the vehicle decelerates rapidly.

One of the primary objects of this invention is to provide an energy absorbing device for a restraint system of the type used to restrain a vehicle passenger, the energy absorbing device being adapted to absorb a significant portion of the energy transferred to the restraint system from a passenger during rapid deceleration of the vehicle.

Another object of this invention is to provide a device of the class described which will efficiently absorb energy at low loads.

Another object of this invention is to provide a restraint system such as described which is adapted substantially to stop the forward movement of a passenger in substantially the same distance as conventional restraint systems, but which is adapted to cause a much lower peak force to be placed on the passenger and which absorbs, rather than stores, a significant portion of the energy transferred thereto.

Another object of this invention is to provide a restraint system of the type described which is economical in construction and efficient in operation.

Other objects and advantages of this invention will be made apparent as the description progresses.

BRIEF DESCRIPTION OF THE DRAWINGS of shown:

1 is

In the accompanying drawing, in which one of several possible embodiments is shown:

FIG. 1 is a side elevation of an energy absorbing device of this invention in a shoulder belt restraint system of this invention;

FIG. 2 is an enlarged section of the energy absorbing device;

FIG. 3 is a bottom view of FIG. 2, looking in the direction of the arrow A in FIG. 2;

Like parts are indicated by corresponding reference characters throughout the various views of the drawings.

DESCRIPTION OF THE PREFERRED EMBODIMENT

Figure 4:
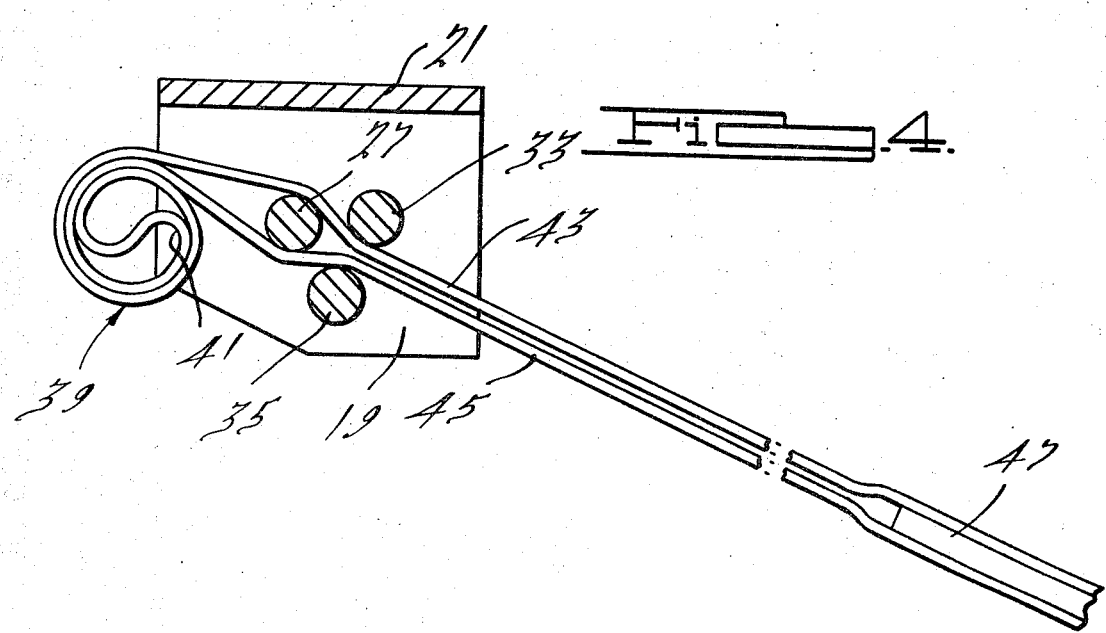
FIG. 4 is a view similar to FIG. 2, illustrating the energy absorbing device after it has been utilized.

Referring now to the drawings, a restraint system of this invention is shown in FIG. 1 to include a shoulder belt assembly 1 adapted to extend across the torso of a passenger between a floor anchor 3 and the roof or roof rail 5 of the vehicle. The belt assembly includes two belt portions 7 and 9 connected together by a buckle 11. The upper end of belt portion 9 is connected to an energy absorbing device 13 which is attached to the roof rail 5.

Referring now to FIGS. 2 and 3, the energy absorbing device 13 includes a generally U-shaped housing 15 having side walls 17 and 19 and a base or connecting wall 21. The housing 15 is located in a well between walls 23 and 25 formed in the roof rail 5 with the walls 17 and 19 extending generally downwardly. A fastener, such as a bolt 27, threaded only at its outer end, extends through a washer 29, the walls 23 and 25 and walls 17 and 19, and has a nut 31 attached to its outer end to secure the housing 15 to the roof rail.

Two spaced apart guiding or bending pins 33 and 35 extend between walls 17 and 19 at points spaced from the bolt 27. As will be made apparent, the bolt 27 and pins 33 and 35 act as guide or bending members for a metal strip 39. As shown, a plane which passes through the center of bolt 27 also passes midway between pins 33 and 35. The distance between pins 33 and 35 is less than the diameter of pin 27 as shown in FIG. 2.

Strip 39 is an elongated thin strip of steel, for example, folded as illustrated at 41, approximately in half to form a double layer strip having portions 43 and 45 which are generally registered with one another. The double layer strip is coiled upon itself from the fold 41 to form a supply of strip material. The portions 43 and 45 extend over opposite sides of bolt 27. The inside surfaces of pins 33 and 35 are closer to the previously mentioned plane than the surfaces of bolt 27 which are farthest from the plane.

The strip portions 43 and 45 pass between the pins 33 and 35 adjacent the inside surfaces thereof and are joined at their extremities to a connector plate 47, by welding, for example. Plate 47 has a slot 49 therein, through which the end portion of belt portion 9 passes. The end of belt portion 9 is connected as indicated at 51 to the remainder of the belt portion.

It will be seen that the location of the pins 33 and 35 and bolt 27 will cause the strip portions 43 and 45 to be spread apart by bolt 27 and then pinched toward one another by pins 33 and 35.

Operation of the restraint system of this invention is as follows:

When the vehicle decelerates rapidly, the passenger, whose forward movement relative to the passenger compartment is restrained by the belt assembly 1, possesses kinetic energy. This energy is transferred to the belt assembly. As the load reaches a predetermined range, the resistance to movement of the belt portions 43 and 45 through the pin and bolt structures 27, 33 and 35 is overcome and the plate 47 is pulled away from the housing 15. This causes the coil 39 to uncoil and the portions 43 and 45 are spread apart by bolt 29 and then are pinched toward one another by pins 33 and 35. The bending of the strip portions by the pins and bolt absorbs energy transferred to the belt system by the passenger. The load on the passenger will remain relatively constant in the above mentioned load range as the energy is absorbed by the bending of the strip portions over the pins as the strip portions are pulled through the energy absorbing device. The load required to pull the two layer strip through the pin and bolt structure is dependent on several factors and can be varied by changing any of several of these factors. For example, changing the strip material, changing the thickness of the strip material, changing the width of the strips, and changing the number of bending pins and the angle of wrap by the strips around the pins may change the load required to pull the strip through the pin and bolt structure and change the amount of energy absorbed by the device.

The energy absorbed by the device 15 prevents substantial rebound by the passenger. Depending upon the speed of the vehicle prior to rapid deceleration and upon the rate of deceleration, and the size and weight of the passenger, the amount of energy absorbed will vary, and the amount of the coil of double layer strip material which is uncoiled and pulled through the pins 33, 35 and bolt 27 will vary. As shown in FIG. 4, several inches of the strip material may be pulled through the bending structure. It will be seen that additional coiled strip material is available for further energy absorption. Moreover, if the coil 39 should ever become completely uncoiled during an energy absorbing condition, the fold 41 is restrained against removal from housing 15 by bolt 27. The strip material would then act under tension to prevent further forward movement of the passenger.

Figure 5:
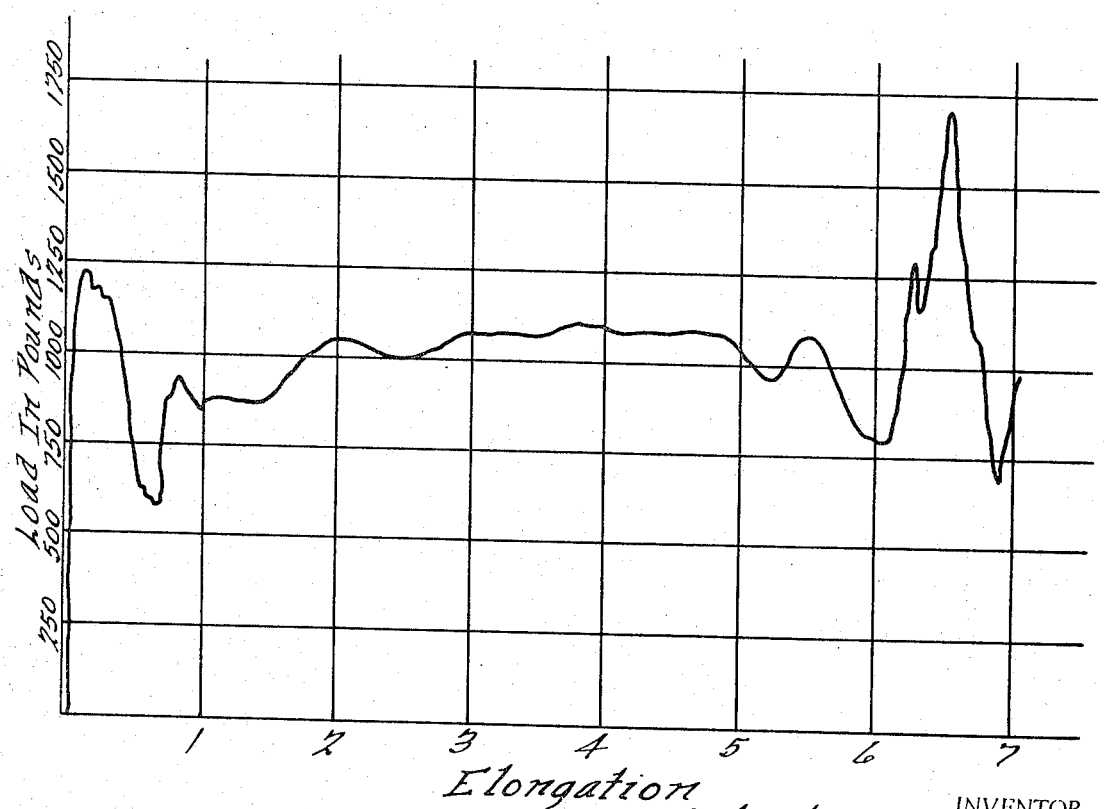
FIG. 5 is a graph illustrating load-elongation characteristics of a device of this invention.

A graph of elongation of one sample of the strip material as a function of the load imposed on the belt system during a static loading condition is shown in FIG. 5. It will be seen that very little elongation occurs as the load increases from zero to about 1,000 pounds. As the load increases from 1,000 pounds to approximately 1,250 pounds, the strip material begins to be pulled through the pin and bolt structure. The load then varies over and under 1,000 pounds as more of the strip material is uncoiled and pulled through the bending structure, but generally levels off at about 1,000 pounds as the strip is uncoiled and passes through the bending structure. After all of the strip material has been uncoiled, which in this instance was about 6 inches of such material, the fold 41 engages the bolt 27 and the strip material is subjected to tension. Since this was a static loading test, the load was increased until the strip material yielded. In actual use, it is not anticipated that the strip material would be subjected to these same conditions. When the load was increased to approximately 1,700 pounds the strip material yielded. However, it will be noted that a considerable amount of energy was absorbed as the strip material was uncoiled and pulled through the bending structure.

While the invention is shown in the form of a shoulder belt system, it will be understood that the invention could be in other forms of restraint systems such as a lap belt system, for example. It will be seen that a significant portion of the kinetic energy which a passenger has will be absorbed during rapid deceleration of the vehicle, thus preventing such energy from being stored in the belt system and then returned to the passenger causing rebound.

In view of the foregoing, it will be noted that the several objects and other advantages of this invention are attained.

Although only one embodiment of the invention has been disclosed and described, it is apparent that other embodiments and modifications of the invention are possible.

I claim:

1. Restraint apparatus for restraining a passenger in a vehicle upon sudden deceleration of the vehicle comprising a restraining belt assembly, said restraining belt system including means for connecting one end portion of the belt system to the vehicle, and energy absorbing means connected to the vehicle for connecting the other end portion of the belt system to the vehicle, said belt system between the end portions thereof, passing in front of the passenger, said energy absorbing means including bendable means capable of being bent, and means for bending said bendable means when the load on the belt system reaches a predetermined range, said bendable means, upon being bent, absorbing energy transferred to said belt assembly by the passenger upon sudden deceleration of said vehicle, said bendable means comprising a pair of strip portions of metal in general registration with one another to form a double layer strip, said strip portions being connected together at one end thereof, said double layer strip being coiled from said one end of said strip portions for a portion of the length of said strip portions, the other end of said strip portions being connected to said belt assembly, said bending means including a first rigid member extending transversely across said strip portions between the latter at a point between the coiled portion of said strip portions and said other end of said strip portions to cause said strip portions to be separated at least a predetermined amount when said other end of said strip portions are pulled away from said first rigid member, second and third rigid members extending transversely across said strip portions on opposite sides of the double layer strip at a point between the first rigid member and said other end of said strip portions, the distance between said second and third rigid members being less than the whole of said predetermined amount plus the thicknesses of said strip portions, whereby said strip members are bent and absorb energy when said other end of said strip portions are pulled away from said rigid members.

2. Restraint apparatus for restraining a passenger in a vehicle upon sudden deceleration of the vehicle comprising a restraining belt assembly, said restraining belt system including means for connecting one end portion of the belt system to the vehicle, and energy absorbing means connected to the vehicle for connecting the other end portion of the belt system to the vehicle, said belt system between the end portions thereof, passing in front of the passenger, said energy absorbing means including bendable means capable of being bent, and means for bending said bendable means when the load on the belt system reaches a predetermined range, said bendable means, upon being bent, absorbing energy transferred to said belt assembly by the passenger upon sudden deceleration of said vehicle, said bendable means comprising a pair of strip portions of metal in general registration with one another to form a double layer strip, said strip portions being connected together at one end thereof, said double layer strip having a curved portion between said one end of said strip portions and said bending means, the other end of said strip portions being connected to said belt assembly, said bending means including a first rigid means extending transversely across said strip portions between the latter at a point between the curved portion of said strip portions and said other end of said strip portions to cause said strip portions to be separated at least a predetermined amount when said other end of said strip portions are pulled away from said first rigid means, second and third rigid means extending transversely across said strip portions on opposite sides of the double layer strip at a point between the first rigid means and said other end of said strip portions, the distance between said second and third rigid means being less than the whole of said predetermined amount plus the thicknesses of said strip portions, whereby said strip members are bent and absorb energy when said other end of said strip portions are pulled away from said rigid means.